March 4, 1941.   R. H. F. MEIK ET AL   2,233,628
MOUSETRAP
Filed July 17, 1939

Inventors.
Richard Henry Francis Meik
Otto Alexander Meik
By
Williams, Bradbury, McCaleb & Hinkle Attys.

Patented Mar. 4, 1941

2,233,628

UNITED STATES PATENT OFFICE 2,233,628

MOUSETRAP

Richard Henry Francis Meik and Otto Alexander Meik, East Melbourne, Victoria, Australia Application July 17, 1939, Serial No. 284,900 In Australia December 23, 1938

6 Claims. (Cl. 43—86)

This invention, as its title implies, has reference to certain improvements in and relating to traps for the catching of mice, rats and other rodents. More particularly, said invention comprehends that class of traps generally known by the term "choker traps."

Hitherto in such type of traps, it has been the accepted practice when setting same, to manually lock them in the set position subsequent to the depressing of the trapping bow proper.

This practice has, particularly to the nervous person, always proved a source of annoyance, and due to the nervous tension under which such person is suffering, accidents occur, due to the partial setting of such trap, resulting in the fingers of the "setter" being caught and injured. The main object, therefore, of our invention resides in overcoming such hitherto disadvantages, and in providing a cheaply made and simply constructed trap which will be easily and quickly set in a minimum of time, and also render it practically impossible for the setter to become nervous, as by its construction and operation in the setting of the trap, it invites confidence, as same is what might be called a "safety setting trap," as by a comparatively slight downward manual finger pressure on a setting bow, a tumbler lever is immediately brought into operation, and the trap is thus automatically (or self) set.

With this object in view, the trap comprises a casing, wherein is fitted the choker-trapping members, and the means for operating same.

These members embrace a wire bow, providing the choker member, connected through finger press setter, to a spiral release urging spring, in combination with a co-acting tumbler lever, comprising the locking means for the whole. This tumbler lever has suspendably carried thereon a trigger plate for releasing the operative members, for the trapping of the mouse or other rodent, and inwardly positioned from the said trigger plate is positioned a bait hook whereon is held the lure for enticing the rodent into the trap.

A further feature of the invention comprises or resides in the shape of the openings through which the mouse's head enters the trap, such allowing of a freer entry than hitherto.

In order, however, that the invention may be clearly understood, the same will be more particularly described and set forth with reference to the accompanying drawing, wherein.

Figure 1:
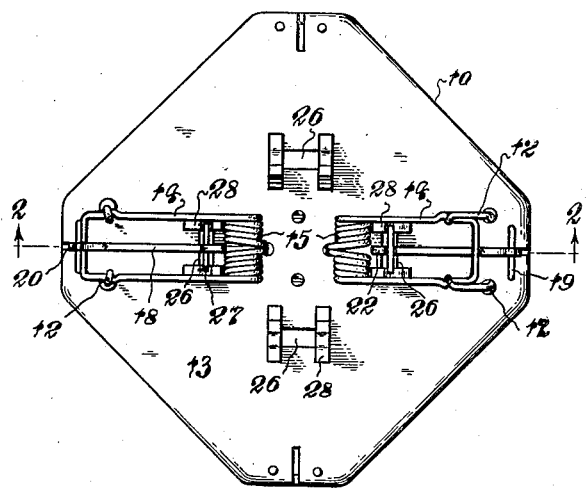
Figure 1 is a plan view.
Figure 2:
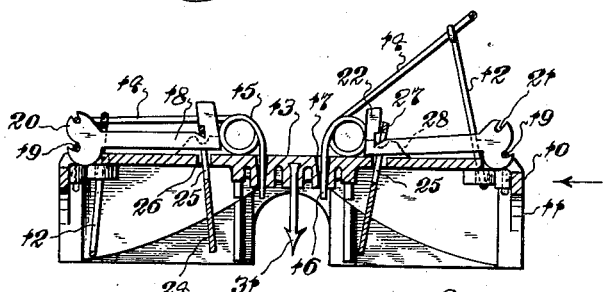
Figure 2 is a side sectional view on the line 2—2 of Figure 1.

In Figures 1 and 2 of the drawing for the sake of clearness, two only unit choker-trapping and related members have been illustrated, but as is seen in Figure 1 provision has been made therein for four such units. It is, of course, obvious however, that any number of units may be employed within a casing.

Referring to the said drawing, and according to one form of carrying out the invention we employ a casing 10 which may be of any desired shape in plan, same also being of the approved height, and made of metal, wood, synthetic resin or such like, or other analogous composition or material. At intervals around the peripheral wall of the said casing, is made any number of openings 11 for the entry of the mouse's head and body.

Figure 4:
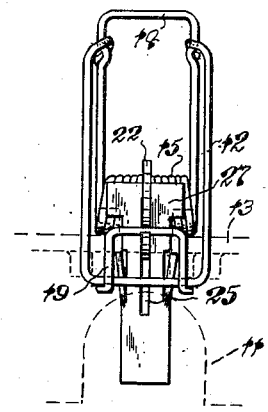
Figure 4 is an enlarged elevation of the unit trapping members looking in the direction of the arrow in Figure 2, the body of the trap being shown in broken lines.

These openings 11 are preferably approximately of an arch or inverted U shape (as shown in Figures 2 and 4) in lieu of the hitherto circular shape, and which herein openings allow of the mouse to completely enter its head and part of its body into the trap, thus ensuring its effective capture.

Corresponding to each of the said openings, we employ trapping units. The aforementioned choker-bow-member 12 is downwardly and guidably held through the upper face plate 13 of the main casing 10 and near to its opening 11, being positioned within and closely adjacent to the latter. This bow 12, by its upstanding arms is freely anchored to another bow member 14 which comprises the finger-press setter member, which is connected to or made integral with a coiled spring 15 securely and operatively held near to the centre of the aforesaid upper face plate 13 of the casing 10 being anchored therein by the free ends 16 being threaded through holes 17 in said casing face plate 13.

Figure 3:
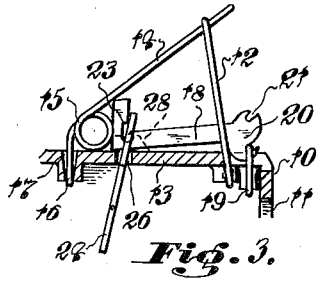
Figure 3 is a side elevation of the trapping bow and related members as a unit in the released position as fitted to a fragmentary sectional portion of the trap.

When the trap is in the idle or unset condition, this finger press setter member 14 is in an angularly and upwardly raised position, and it will be thereby appreciated that by virtue of its carrying the choker bow, the latter is likewise in the raised position as is clearly shown in Figures 3 and 4 and the right hand unit in Figure 2.

Conversely, when in the "set" condition, the choker bow 12 is in the lowered position, and coincides with its casing opening 11 into the trap, being forced or urged to such position by the manual finger press setter member 14 which is then in parallel alignment with the upper face plate 13 of the casing 10, as is clearly shown in the left hand unit in Figure 2.

Immediately beneath the said finger press setter member 14 is fitted a tumbler lever 18 the outer end of which is freely anchored by clip 19 or otherwise, to the casing 10—13.

Figures 7, 8:
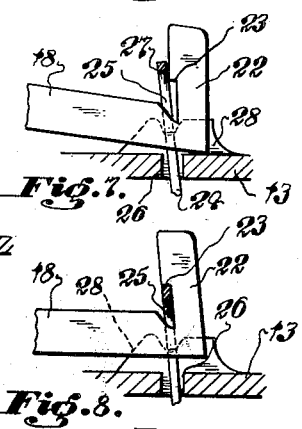
Figures 7 and 8 are fragmentary detail views of the outer end of the tumbler lever and trigger plate respectively showing same in the released and locked positions.

This tumbler lever 18, at such end, is made with an upstanding lug 20 having an indent 21 made therein, and wherein is retained the front end of the finger press setter member 14, when in the set position, see particularly the left-hand side of Figure 2. The opposite end of the said tumbler lever 18 is also made with a lug 22 with a lower positioned indent 23 which carries and engages within a slot 25 in the upper end of a downwardly extending trigger plate 24, (See particularly Figure 8 and the left-hand side unit in Figure 2). The said trigger plate is freely threaded through and operates within an opening 26 made therefor, in the upper face plate 13 of the casing 10.

Each of these trigger plates 24 is integrally made with outwardly extending knife-edged shoulders 27 which co-act within raised fulcrum brackets 28 made integral with the upper face plate 13 of the casing 10 disposed on either side of the opening 26 therein, so as to impart to said trigger plate a free and sensitive swinging movement.

Figures 5, 6:
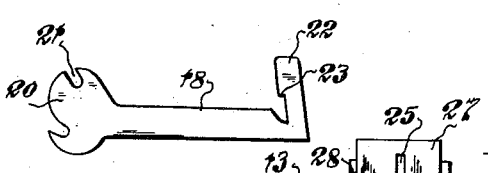
Figure 5 is a detail side view of the tumbler lever.
Figure 6 is a detail face view of the trigger plate.

To retain the said trigger plates 24 against inadvertent withdrawal and in operative position same is made with companion cut and outwardly spread nibs or such like shouldered formations 30 which freely abut against the underside of the upper face plate 13 of the casing 10 as clearly illustrated in Figure 6.

Inwardly positioned from the said trigger plate 24 is positioned a hook 31 for holding the lure bait, and which trigger and hook are suspendably held and positioned inwardly from the bow choker member 12 and at an approved distance therefrom, to allow the mouse to make contact with said trigger plate 24, after passing its head and a portion of its body through the said bow member 12.

Immediately such contact is made (and due to the sensitiveness of the herein operative members), the upper end of the trigger plate 24 is released from its indent 23 in the tumbler lever 18 (see particularly Figures 7 and 3 and the righthand unit in Figure 2), and through such action, the latter likewise releases the finger press setter member 14 which allows the latter, through the coiled urging spring 15 to instantly upwardly move, drawing with it the connected bow choker member 12, thus effectively catching and trapping the mouse.

It is, of course, to be understood that the herein invention, although described in relation, and referring to the catching of mice, rats and other like rodents, is also applicable and usable for the trapping of other animals, it of course being obvious that same would be made on a corresponding scale for such purposes.

We claim:

1. An improved trap of the choker type for the catching of mice, rats, and other rodents, comprising a casing having arched openings for the entry into said casing of the rodent, trapping members fitted on and within said casing, a unit of said trapping members consisting of a choker bow, finger press setting means carrying the said choker bow, a coil spring operating the finger press means, a tumbler lever freely anchored to and operating on the said casing, locking means incorporated with the said tumbler lever and coacting with the outer end of the finger press means, a trigger plate freely swung within said casing, and made with a slot wherethrough is threaded and carried the tumbler lever, and a further locking means near the inner end of the tumbler lever coacting with the said trigger plate.

2. In an improved trap of the choker type for the catching of mice, rats, and other rodents, comprising a casing, a tumbler lever and a trigger plate respectively operating on and within the said casing, outwardly spread integral nibs on the said trigger plate abutting against the underside of the upper face of the casing to retain the said trigger plate in operative position.

3. In an improved trap of the choker type for the catching of mice, rats, and other rodents, comprising a casing, a trigger plate operating within the said casing, outwardly extending knife edged shoulders on the said trigger plate, fulcrum brackets integrally formed on the said casing and substantially raised therefrom, said shoulders engaging within the said fulcrum brackets and outwardly spread integral nibs on the said trigger plate abutting against the under side of the upper face of the casing.

4. An improved trap of the choker type for the catching of mice, rats, and other rodents, comprising a casing, a choker bow operatively fitted therein, a spring controlled finger press setting bow carrying said choker bow, a tumbler lever freely mounted at its outer end to the said casing so as to direct its total weight rearwardly, an indent within a lug at the outer end of the said tumbler lever wherein said finger press setting bow engages to retain it in the operative position, an indent in a lug at the opposite end of the tumbler lever, a trigger plate having a slot therein and being carried on the tumbler lever, said trigger plate engaging by means of its head end with the indent in the lug on the inner end of the said tumbler lever for retaining it in the set position.

5. An improved trap of the choker type for the catching of mice, rats, and other rodents, comprising a casing, arched-shaped entrance openings formed therein, a choker bow disposed and operating within the said casing and when in the set position coinciding with its respective opening, a spring controlled finger press setting bow carrying the said choker bow, a tumbler member, a slotted freely swung trigger plate carried thereon, indents on the outer and inner ends of the said tumbler lever for the engagement of the finger press setting bow and the trigger plate respectively, and bait means disposed within the casing inwardly from the choker bow.

6. An improved trap of the choker type for the catching of mice, rats, and other rodents comprising a casing, a tumbler lever freely anchored to and operating on said casing, a trigger plate formed with a slot and being adapted to be carried by the said tumbler lever, outwardly extending knife edged shoulders on the said trigger plate, and fulcrum brackets integrally formed on the casing and adapted to coact with the said knife edged shoulders of the trigger plate to impart a free, sensitive and instantaneous movement to the said trigger plate when acted upon by the rodent.

RICHARD HENRY FRANCIS MEIK.
OTTO ALEXANDER MEIK.